June 26, 1962 J. D. GIBBS 3,041,012
AIRCRAFT
Filed March 21, 1961 11 Sheets-Sheet 1
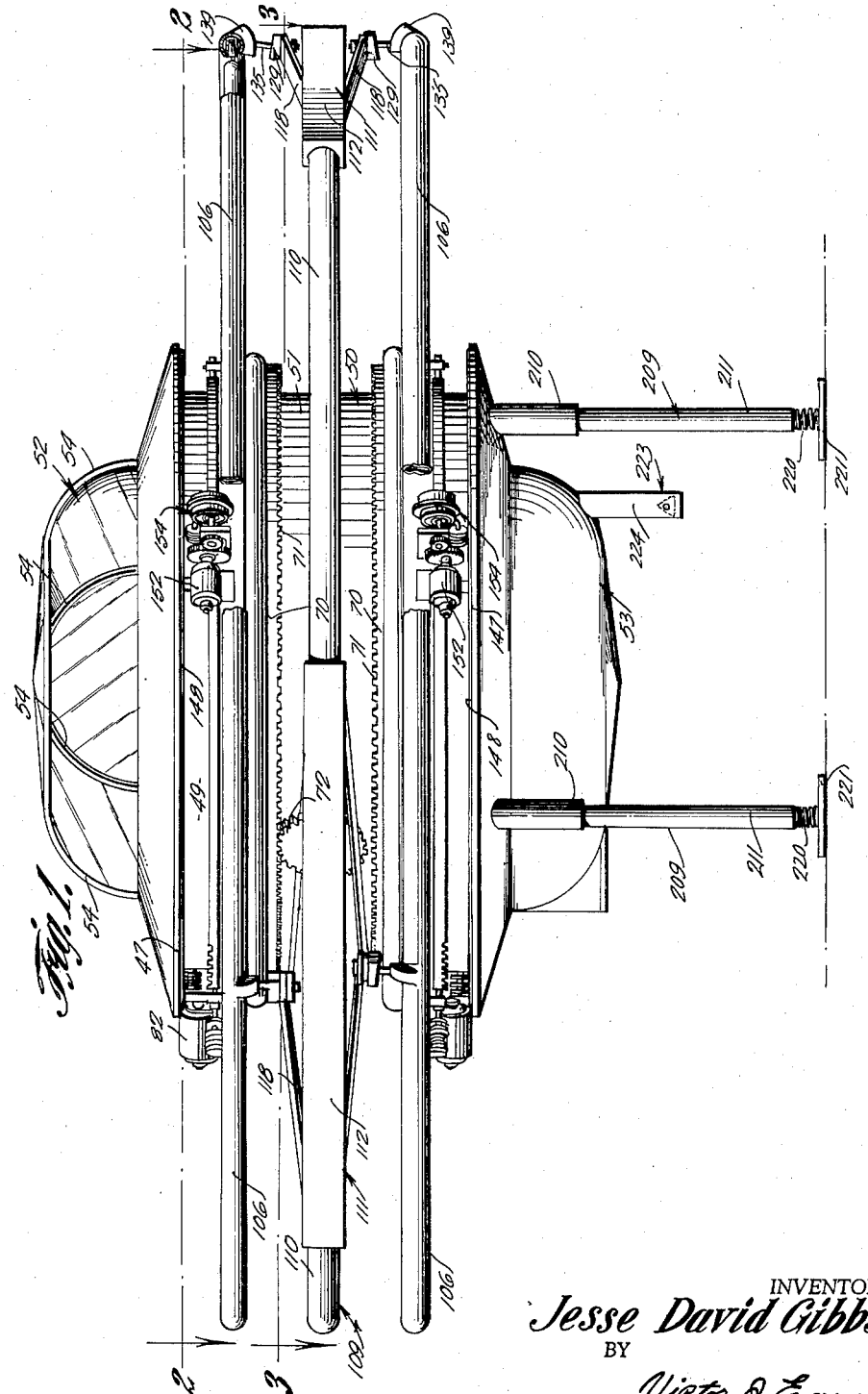
INVENTOR.
Jesse David Gibbs,
BY
Victor J. Evans & Co
Attorneys

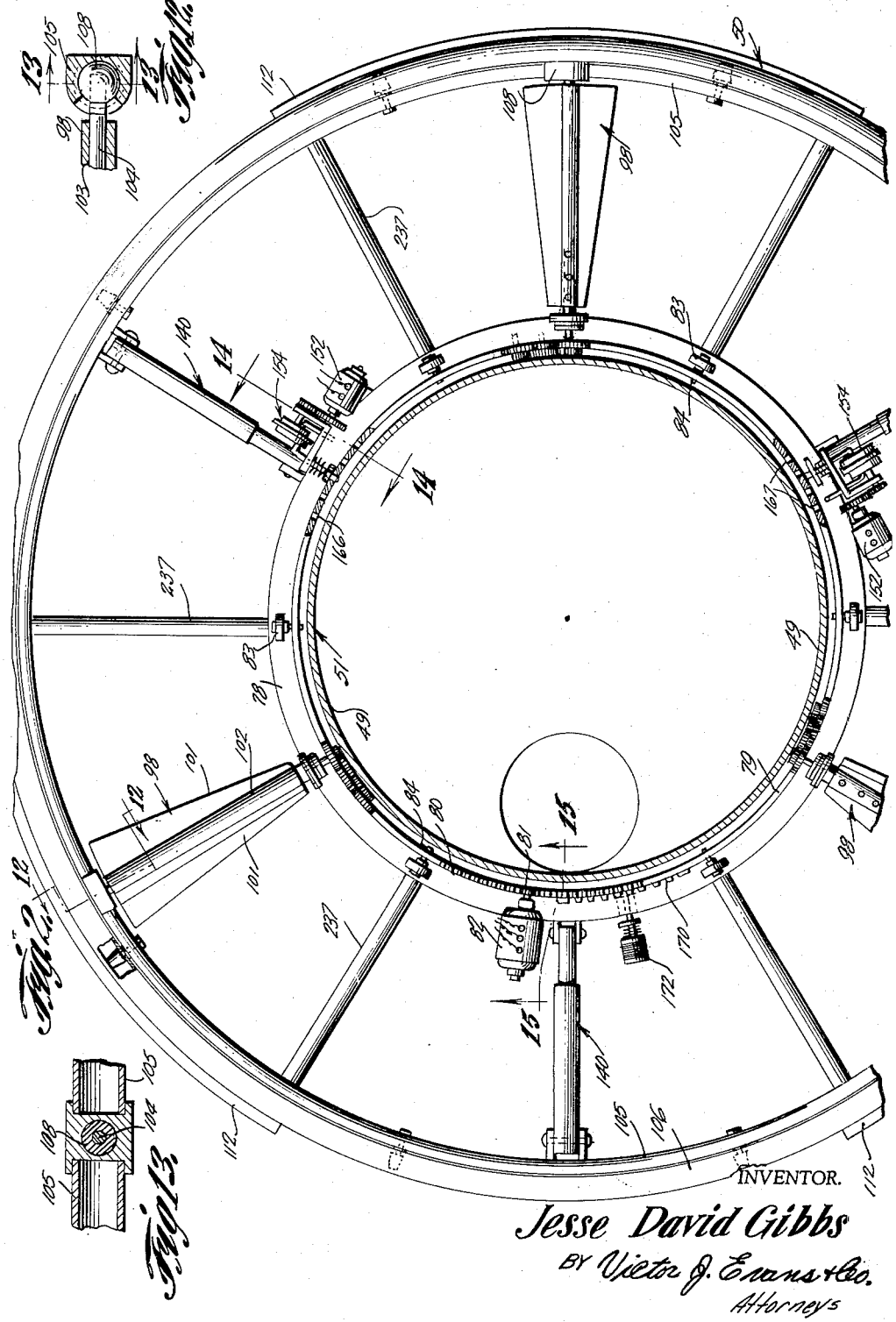

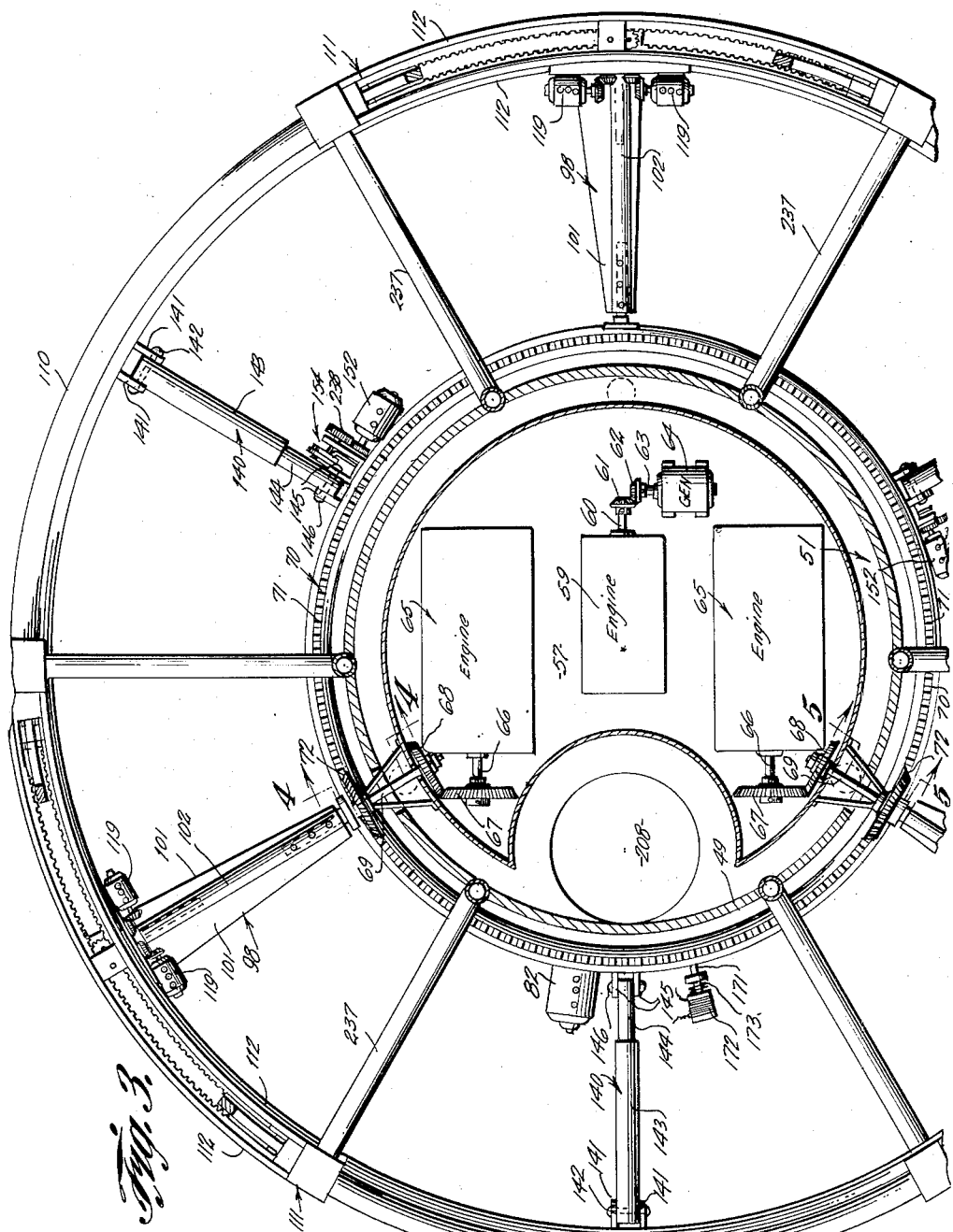

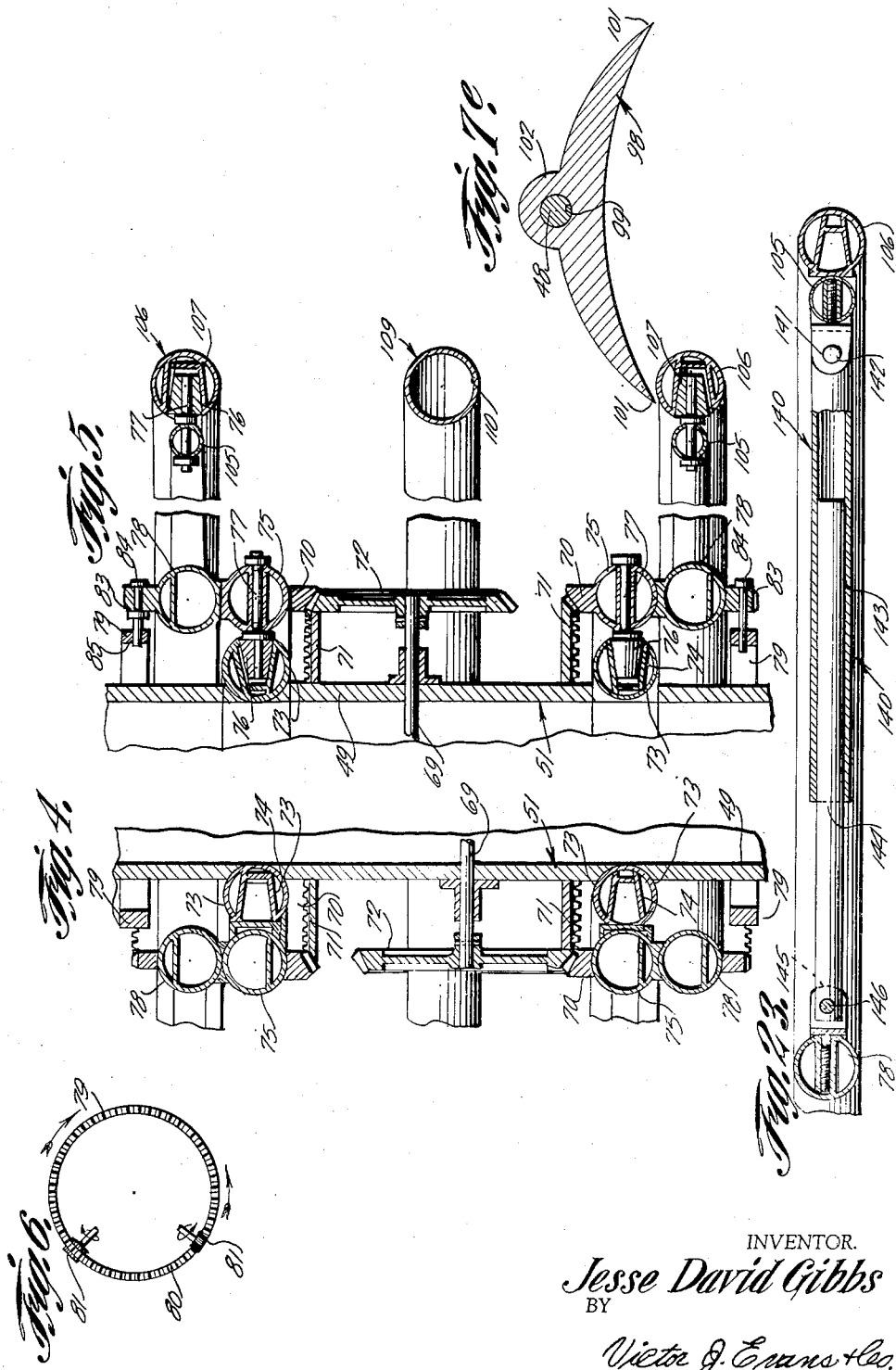

June 26, 1962  J. D. GIBBS  3,041,012
AIRCRAFT
Filed March 21, 1961  11 Sheets-Sheet 5
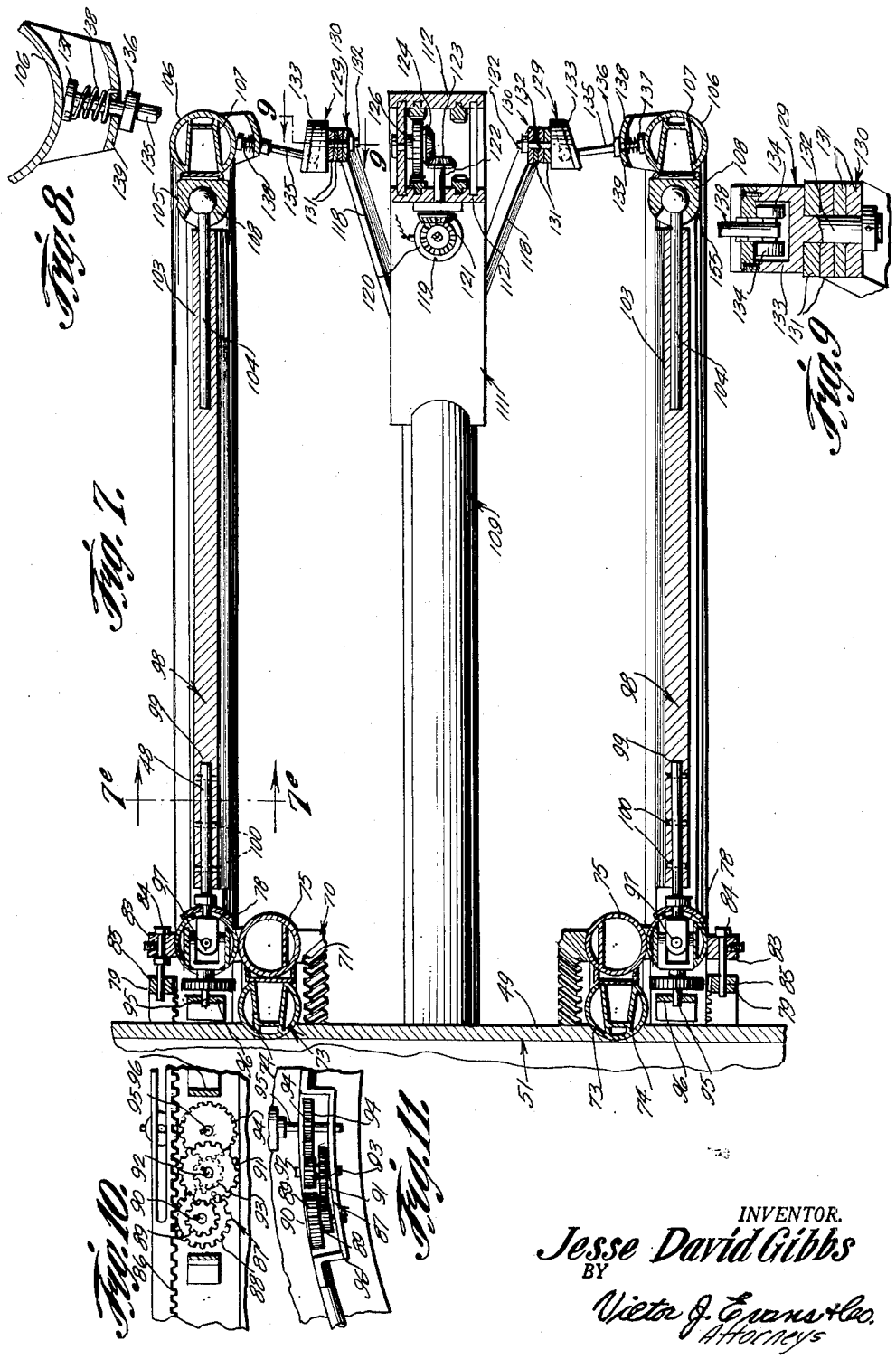
INVENTOR.
Jesse David Gibbs
BY
Victor J. Evans & Co.
Attorneys

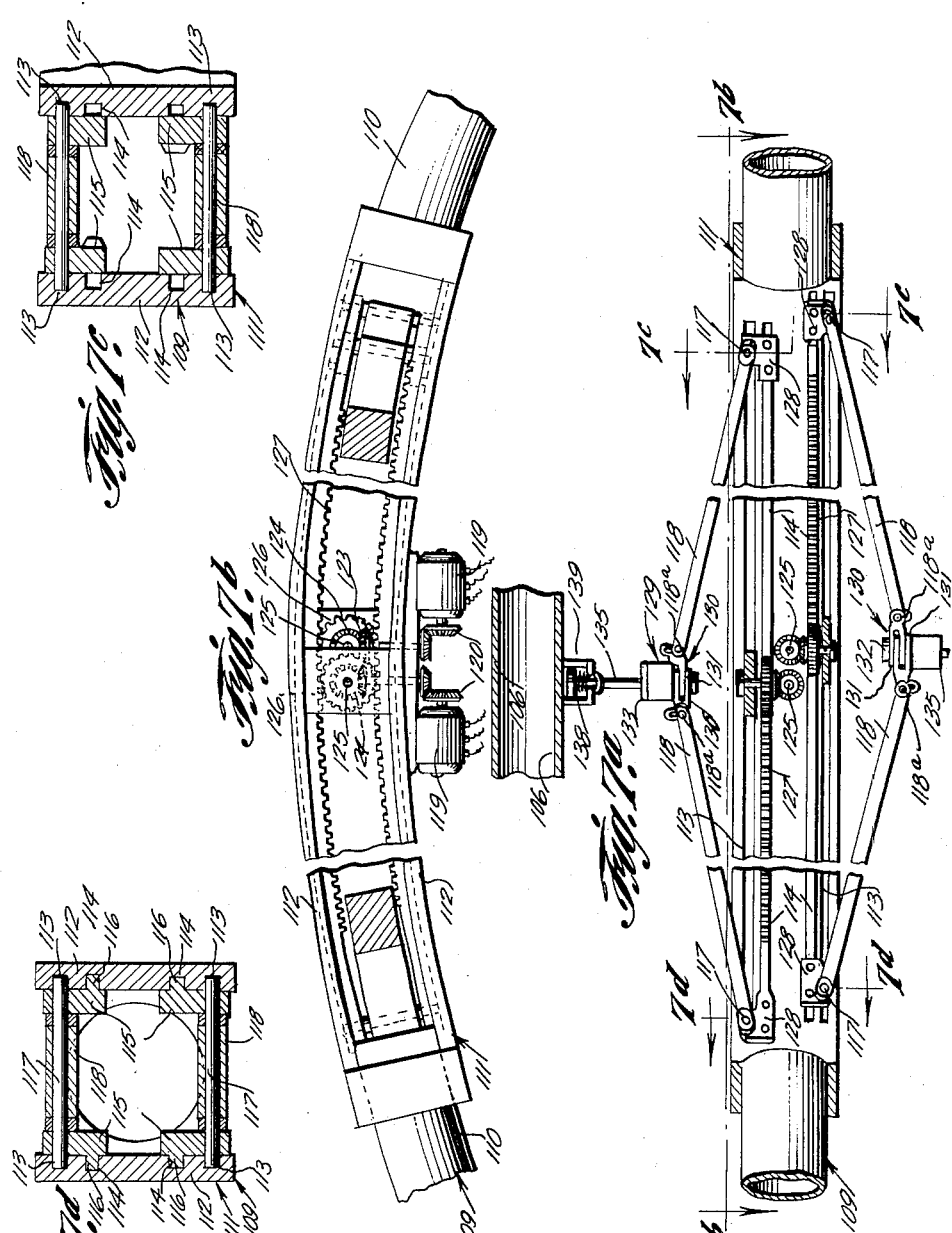

June 26, 1962 J. D. GIBBS 3,041,012
AIRCRAFT
Filed March 21, 1961 11 Sheets-Sheet 7
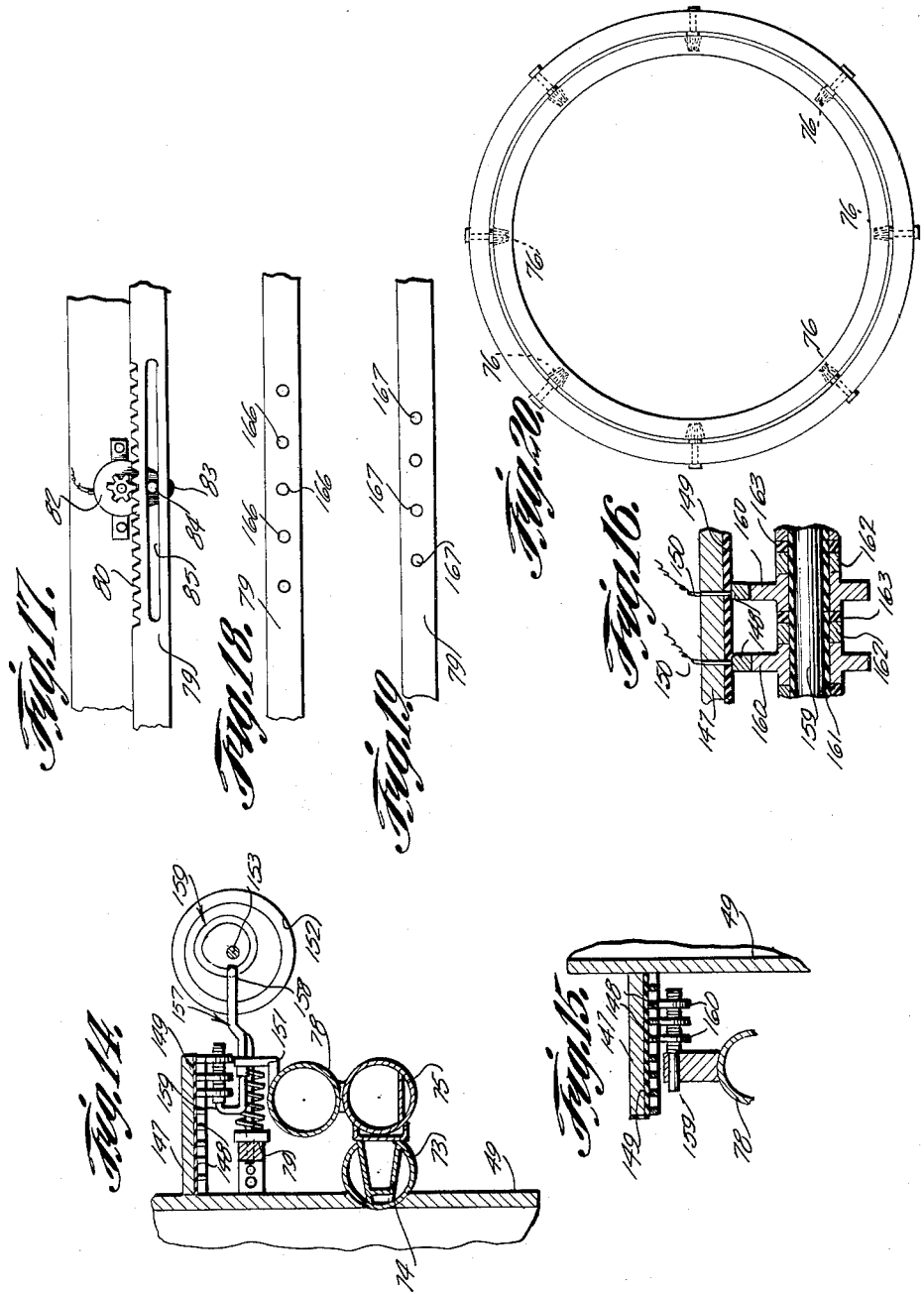
INVENTOR.
Jesse David Gibbs
BY
Victor J. Evans + Co.
Attorneys June 26, 1962 J. D. GIBBS 3,041,012
AIRCRAFT
Filed March 21, 1961 11 Sheets-Sheet 8
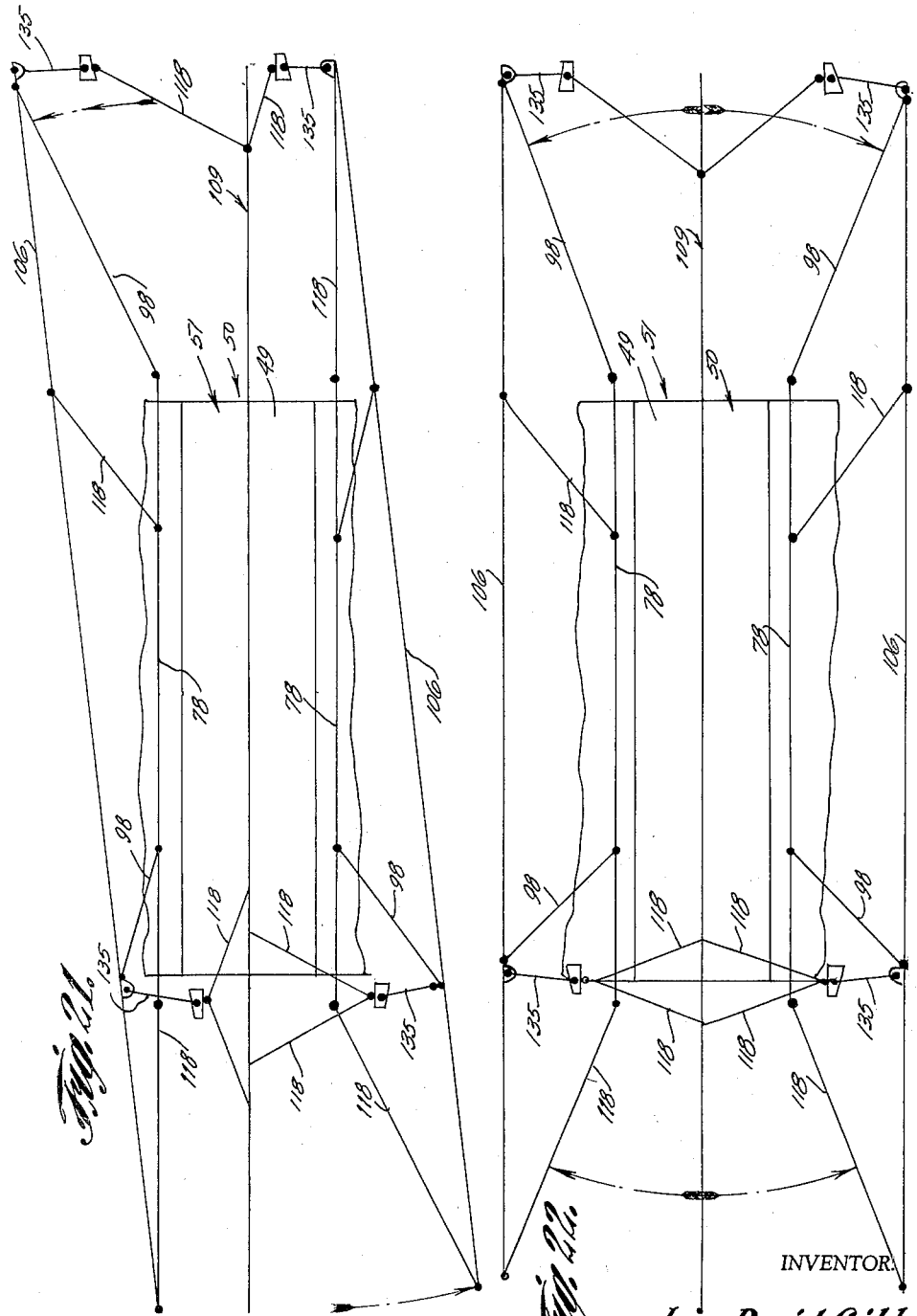
INVENTOR
BY Jesse David Gibbs
Victor J. Evans & Co.
Attorneys

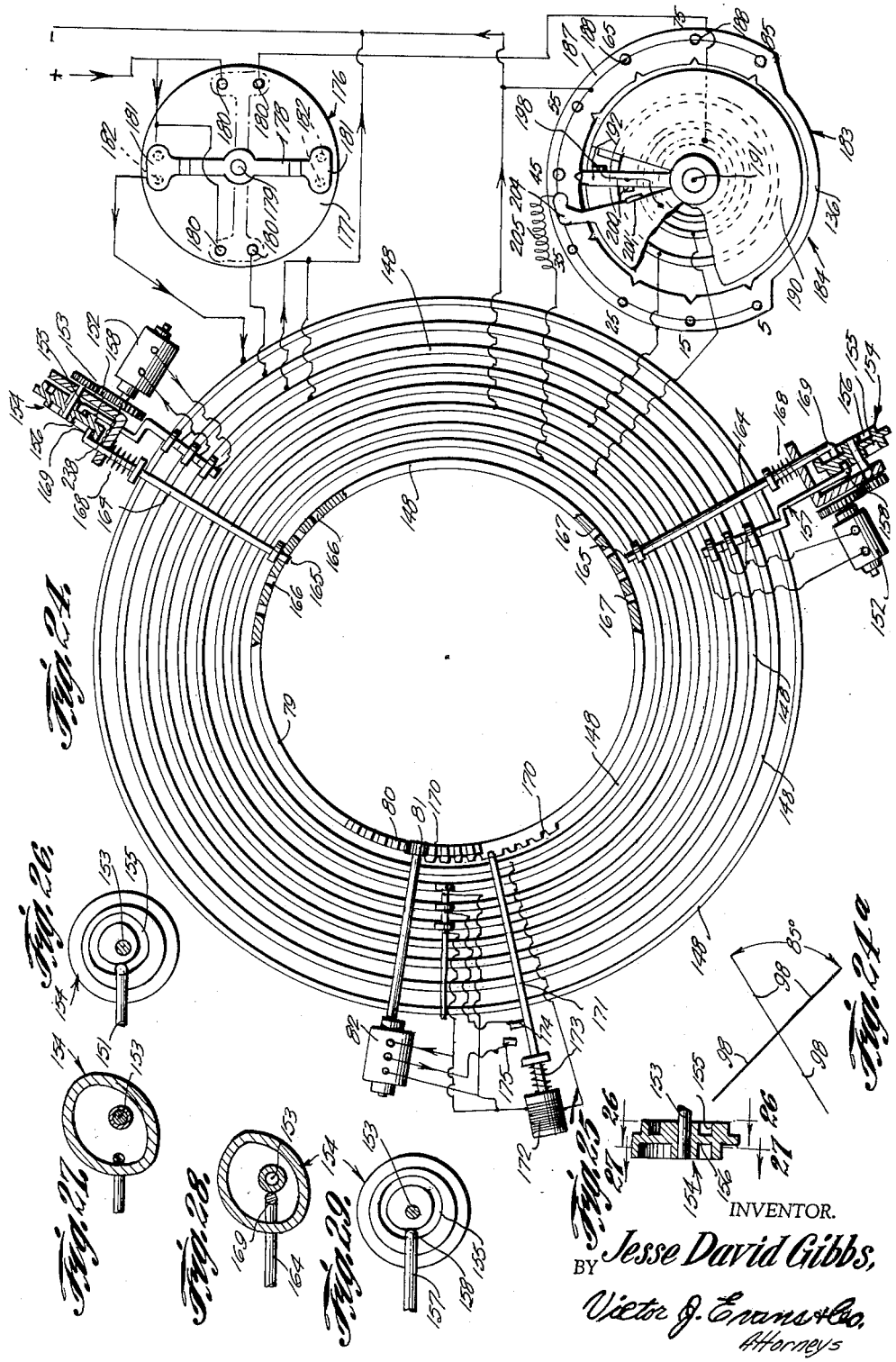

June 26, 1962  J. D. GIBBS  3,041,012
AIRCRAFT
Filed March 21, 1961  11 Sheets-Sheet 10
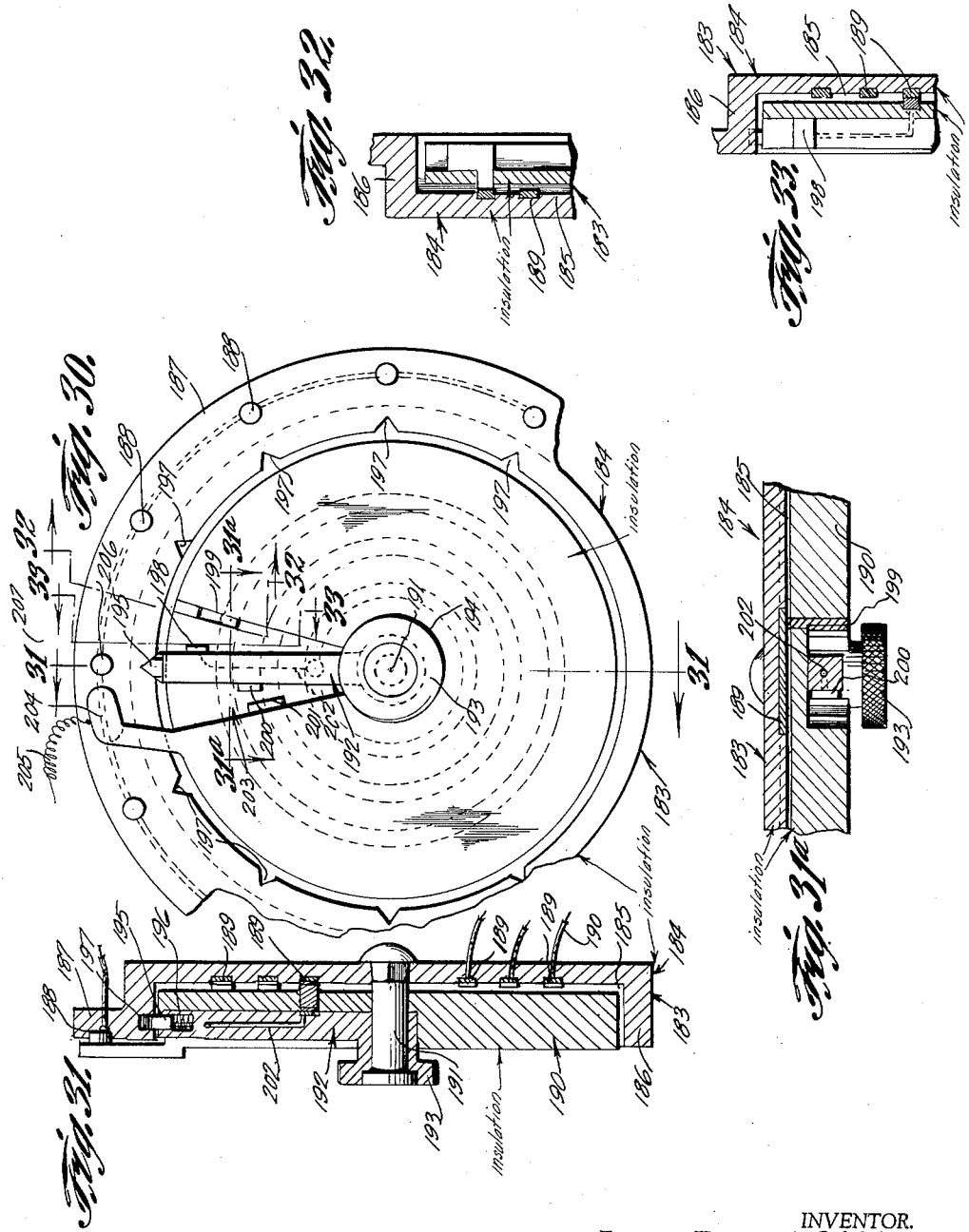
INVENTOR.
Jesse David Gibbs
BY
Victor J. Evans & Co.
Attorneys

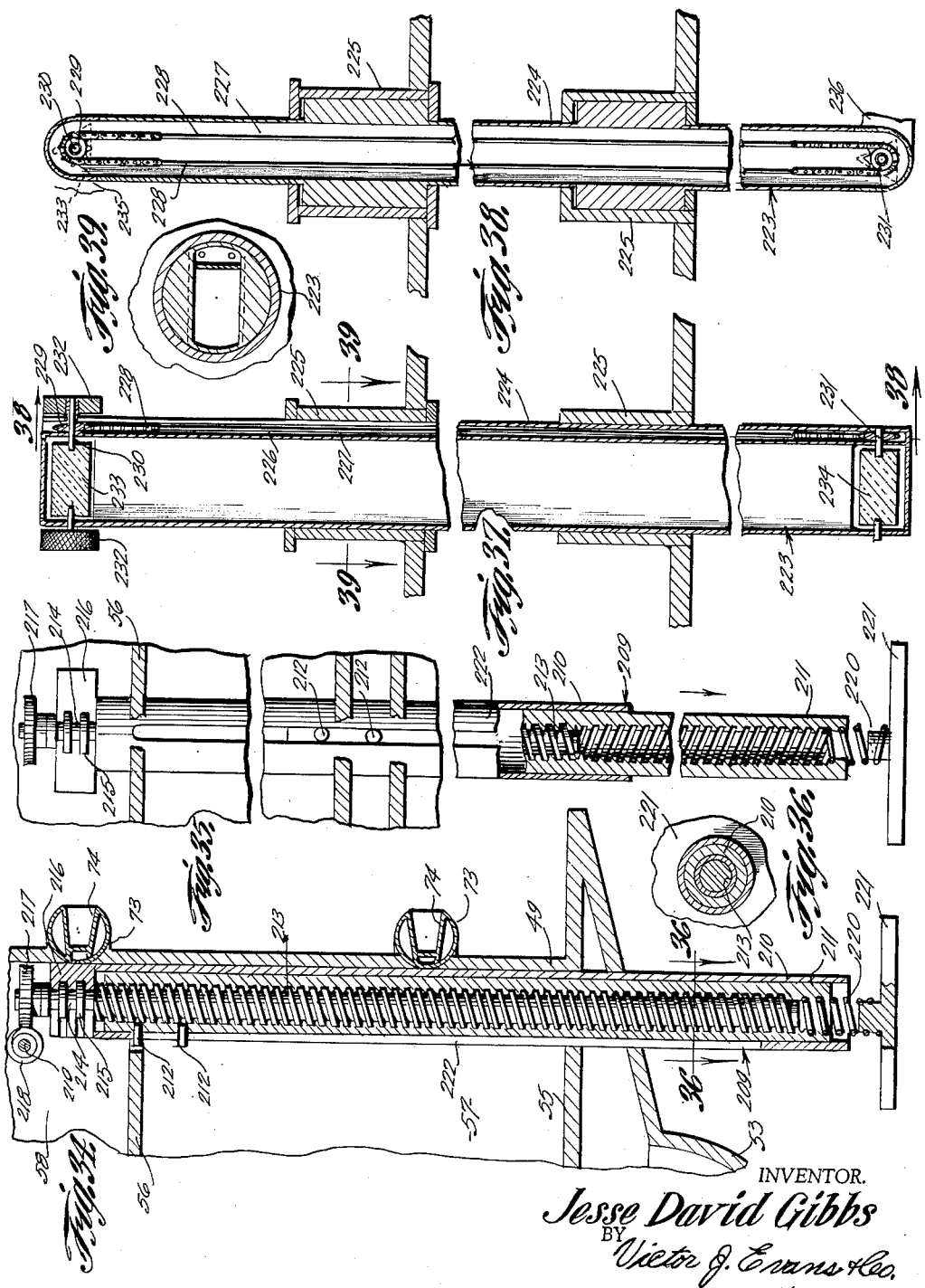

United States Patent Office 3,041,012
Patented June 26, 1962

3,041,012
AIRCRAFT
Jesse David Gibbs, Box 351, Tuscarawas, Ohio
Filed Mar. 21, 1961, Ser. No. 97,375
2 Claims. (Cl. 244—17.23)

This invention relates to a flying machine or aircraft.

The primary object of this invention is to provide an aircraft which is adapted to be conveniently used for transporting cargo, passengers or the like, and wherein the aircraft of the present invention includes a novel means for causing the aircraft to travel in the desired location with the desired rate of speed.

A further object is to provide an aircraft of the type stated which includes a highly efficient means for adjusting the pitch of the propellers or blades whereby the speed of the aircraft can be effectively regulated or controlled as desired, and wherein there is also provided a means for tilting or changing the angular position of the propeller blades in order to provide a means for steering or guiding the aircraft during flight.

A still further object of the present invention is to provide a flying saucer type of wingless aircraft which has propellers arranged around a passenger or cargo compartment and wherein the aircraft can be made to fly in a desired direction such as straight up, forward, backward, or to each side, the aircraft being constructed so that the propellers will distribute the lift in a balanced and even manner so as to provide effective control of the aircraft by the pilot thereof.

Still another object is to provide such an aircraft that is economical to manufacture and efficient in operation and which is rugged in structure and foolproof in use.

These and other objects of the invention will become apparent from a reading of the following specification and claims, together with the accompanying drawings, wherein like parts are referred to and indicated by like reference characters and wherein:

FIGURE 1 is a side elevational view of the aircraft of the present invention.

FIGURE 2 is a sectional view taken on the line 2—2 of FIGURE 1.

FIGURE 3 is a sectional view taken on the line 3—3 of FIGURE 1.

FIGURE 4 is a fragmentary sectional view illustrating certain constructional details of the present invention and showing the various rings and the means for rotating the propeller blades.

FIGURE 5 is a view generally similar to FIGURE 4 and showing the means for driving the upper propeller rings in the desired direction.

FIGURE 6 is a diagrammatic view illustrating the upper and lower gear drive for rotating the propeller carrying rings in opposite directions.

FIGURE 7 is a fragmentary sectional view showing a portion of the mechanism for changing the pitch of the propellers and also the means for elevating and lowering the propeller carrying rings.

FIGURE 7$^a$ is a fragmentary elevational view, with parts broken away and in section showing the stationary ring assembly and the means for raising and lowering the propeller carrying rings.

FIGURE 7$^b$ is a sectional view taken on the line 7$^b$—7$^b$ of FIGURE 7$^a$.

FIGURE 7$^c$ is an enlarged sectional view taken on the line 7$^c$—7$^c$ of FIGURE 7$^a$.

FIGURE 7$^d$ is a sectional view taken on the line 7$^d$—7$^d$ of FIGURE 7$^a$.

FIGURE 7$^e$ is a cross-sectional view taken through one of the propeller blades.

FIGURE 8 is an enlarged sectional view showing a part of the lowering and raising mechanism of FIGURE 7.

FIGURE 9 is an enlarged sectional view taken on the line 9—9 of FIGURE 7.

FIGURE 10 is a fragmentary elevational view, with parts broken away and in section, showing a portion of the mechanism for changing the pitch of the propellers.

FIGURE 11 is a fragmentary top plan view showing a portion of the mechanism of FIGURE 10.

FIGURE 12 is a fragmentary sectional view showing the universal mounting for the propeller blades and the rotating rings.

FIGURE 13 is a sectional view taken on the line 13—13 of FIGURE 12.

FIGURE 14 is a sectional view taken on the line 14—14 of FIGURE 2.

FIGURE 15 is a sectional view taken on the line 15—15 of FIGURE 2.

FIGURE 16 is an enlarged sectional view showing a portion of the mechanism of FIGURE 15.

FIGURE 17 is a fragmentary elevational view showing the means for turning the pitch ring.

FIGURES 18 and 19 are fragmentary elevational views showing the stop holes or openings in the pitch ring.

FIGURE 20 is a diagrammatic view showing a portion of the housing of the aircraft and with one of the stationary rings mounted thereon and also showing the location of the roller bearings for mounting one of the rotating rings.

FIGURES 21 and 22 are diagrammatic views showing the position of the parts as for elevating straight ahead or turning when the aircraft is flying.

FIGURE 23 is a sectional view showing a slide bar for keeping the rings from having side motion.

FIGURE 24 is a diagrammatic view showing the electrical and mechanical means for controlling and changing the pitch of the propellers as shown in FIGURE 24$^a$.

FIGURE 24$^a$ is a diagrammatic view showing the angle of pitch assumed by the propeller blades.

FIGURE 25 is a fragmentary sectional view illustrating the cam mechanism as shown in FIGURE 24 for operating the contact rollers for making and breaking the circuits and also for operating the lock pin for the pitch rings.

FIGURE 26 is a sectional view taken on the line 26—26 of FIGURE 25.

FIGURE 27 is a sectional view taken on the line 27—27 of FIGURE 25.

FIGURE 28 is a view similar to FIGURE 27 with the cam in a different position.

FIGURE 29 is a view similar to FIGURE 26 with the cam in a different position.

FIGURE 30 is an enlarged elevational view with parts broken away showing the switch of FIGURE 24.

FIGURE 31 is a sectional view taken on the line 31—31 of FIGURE 30.

FIGURE 31$^a$ is a sectional view taken on the line 31$^a$—31$^a$ of FIGURE 30.

FIGURE 32 is a sectional view taken on the line 32—32 of FIGURE 30.

FIGURE 33 is a sectional view taken on the line 33—33 of FIGURE 30.

FIGURE 34 is an enlarged sectional view showing a part of the main body of the machine with the landing legs mounted thereon and in retracted position.

FIGURE 35 is a sectional view taken approximately on the line 35—35 of FIGURE 34.

FIGURE 36 is a sectional view taken on the line 36—36 of FIGURE 34.

FIGURE 37 is sectional view taken through the periscope used for viewing the ground from a cabin when taking-off or landing.

FIGURE 38 is a sectional view taken approximately on the line 38—38 of FIGURE 37.

FIGURE 39 is a sectional view taken on the line 39—39 of FIGURE 37.

Referring in detail to the drawings, the numeral 50 indicates the aircraft of the present invention which is shown to comprise a hollow housing 51 that may be shaped to include a cylindrical wall portion 49, and the aircraft is provided with an upper dome 52 as well as a lower depending section 53, FIGURE 1. The dome 52 may be made of a suitable transparent material such as a suitable plastic, and the dome 52 may be provided with reinforcing grips 54.

As shown in FIGURE 34, for example, there is provided within the housing 51 of the aircraft spaced parallel horizontally disposed decks or platforms 55 and 56 which define in the housing lower and upper compartments 57 and 58. The upper compartment 58 is adapted to receive or support therein passengers, cargo or the like, and arranged in the lower compartment 57 is an engine or motor 59, FIGURE 3. The motor 59 serves to operate a shaft 60 which has a gear 61 thereon, and the gear 61 meshes with a gear 62 on a shaft 63, and the shaft 63 is connected to an electrical generator 64 which can be used for supplying electricity for the various components of the aircraft.

Also arranged in the lower compartment 57 is a pair of engines or motors 65 of a suitable construction, and the motors 65 serve to operate the shafts 66 which have gears 67 thereon, FIGURE 3, and the gears 67 mesh with gears 68 on shafts 69. As shown in FIGURE 7 for example there is provided upper and lower ring gears 70 which surround the housing 51, and the upper and lower ring gears 70 are provided with teeth 71 thereon, there being gears 72 on the shafts 69 which mesh with the teeth 71 of the ring gears 70.

There is further provided upper and lower tubular support rings which surround the housing 51 and which are secured thereto or formed integral therewith, and arranged within the support rings 73 are tracks or rails 74, FIGURE 7. The numeral 75 designates each of a pair of upper and lower ring members which are arranged for rotation around the support rings 73, and the ring gears 70 are secured to or formed integral with the ring members 75. Tapered bearings such as the bearings 76 are adapted to be secured to the ring members 75 as for example by means of securing elements 77, and the tapered bearings 76 are mounted for movement through the tracks 74 in the support rings 73.

The numeral 78 indicates tubular hollow ring elements that surround the housing 51, and the ring elements 78 are secured to or formed integral with the ring members 75. There is also provided pitch rings 79 which surround the housing, and the pitch rings 79 have teeth 80 along a portion thereof, FIGURE 2, and the numeral 81 indicates a gear which meshes with the teeth 80 of the pitch ring, the gear 81 being driven by a suitable electric motor 82. As shown in FIGURE 5 for example, lugs 83 are affixed to each ring element 78 or secured thereto or formed integral therewith, and pins 84 extend through the lugs 83, and the pins 84 also extend through slots 85 in the pitch rings 79.

Referring to FIGURES 10 and 11 of the drawings, it will be seen that there is provided a gear reduction unit which is indicated generally by the numeral 87, and the gear reduction unit 87 includes a gear section 88 that meshes with teeth 86 on an adjacent pitch ring 79, and the gear reduction unit 87 includes a gear section 89 contiguous to the gear section 88, and these gear sections 88 and 89 are arranged on a supporting shaft 90. The gear reduction unit 87 further includes a gear 91 which meshes with the gear 89, and the gear 91 is adapted to be arranged on a shaft 92 along with a gear 93, and the gear 93 meshes with a gear 94 that is affixed to or keyed to a shaft 95. A shield or cover member 96 may be provided for the gear reduction unit 87. The shaft 95 is connected to a driven shaft 48 through the medium of a universal joint 97, FIGURE 7, and the numeral 98 designates each of a plurality of propellers or blades. Each of the propellers 98 is provided with a recess or opening 99 in an end thereof for receiving a corresponding shaft 48, and the propeller 98 is adapted to be secured to the shaft 48 as for example by means of securing elements 100. As shown in FIGURE 7e, the side edge portions of the propeller 98 are tapered as at 101, and the propeller is provided with an elongated enlarged shoulder or ridge 102. The propeller 98 also has a recess or opening 103 for receiving therein with a slidable connection, a shaft 104. The shafts 104 are connected to tubular ring pieces 105, and surrounding the ring pieces 105 are tubular ring units 106, FIGURE 5. The ring units 106 are provided with inner tracks or rails 107 whereby tapered bearings such as the bearings 76 that are affixed to the ring piece 105, can travel through the tracks 107 so as to minimize friction between these moving parts. The numeral 108 indicates universal joints for connecting the shafts 104 to the ring pieces 105.

The aircraft of the present invention further includes a circular support unit which is indicated generally by the numeral 109, and the support unit 109 consists of a plurality of arcuate or curved sections 110 which have their adjacent ends joined together by body elements 111, and as shown in the drawings each of the body elements 111 includes spaced apart arcuate wall members 112. The wall members 112 are provided with slots and grooves 113 and 114, FIGURE 7d, and there is provided a plurality of sliding racks 115 which have tongues 116 mounted for sliding movement in the grooves 114. Bars or arms 118 have pins 117 extending therethrough, and the pins 117 are mounted for sliding movement through the slots 113. Motors 119 are provided for rotating gears 120, FIGURE 7b, and the gears 120 mesh with gears 121 on shafts 122. The shafts 122 have gears 123 thereon that mesh with gears 124 on shafts 125, and the shafts 125 have gears 126 thereon, and the gears 126 mesh with the teeth 127 of the racks 115.

The arms 118 are connected to plate portions 128 of the racks 115 by means of the pivot pins 117.

There is further provided connector assemblies which are indicated generally by the numeral 129, and the connector assemblies 129 include bracket members 130 that have interfitting parts 131, FIGURE 7a and FIGURE 9, and the numeral 132 indicates a pin or stud which extends through the interfitting parts 131, there being a bracket 133 secured to or formed integral with the stud 132. Rollers 134 are movably mounted in the bracket 133, and a rod 135 is connected to the rollers 134, there being spaced apart collars 136 and 137 on the rod 135, FIGURE 7. The rod 125 extends through a bracket piece 139 that is secured to a corresponding ring 106, and a coil spring 138 is arranged on each rod 135 as shown in the drawings, for a purpose to be later described.

There is further provided a plurality of spaced apart brace assemblies 140, FIGURE 3, and the brace assemblies 140 include outer hollow members 143 that are pivotally connected as at 142 to ears 141, and the ears 141 are secured to or formed integral with the inner surfaces of the ring pieces as shown in the drawings. Inner members 144 are mounted for telescoping or sliding movement in the outer members 143, and the inner members 144 are pivotally connected between ears 145 as at 146, and the ears 145 are secured in place as shown in FIGURE 3 for example.

As shown in the drawings upper and lower spaced parallel circular plates 147 are secured to or formed integral with the wall portion 49 of the housing 51, FIGURE 14, and a plurality of concentrically arranged tracks 148 are suitably affixed to the plates 147, and the tracks 148 are insulated from the plates as for example by means of insulation 149, FIGURE 16. Electrical conductors or wires 150 are electrically connected to the tracks 148. The numeral 151 indicates a supporting bracket, and arranged contiguous to the bracket 151 is a driving motor 152 which serves to rotate or selectively drive a cam 154 that is mounted on a shaft 153. The cam 154 includes a pair of sections 155 and 156, and the sections 155 and 156 are arranged in superposed relation with respect to each other. The numeral 157 indicates a rod which has a portion 158 arranged in engagement with the first cam section 155, and the rod 157 includes a supporting section 159 which has a plurality of rollers 160 rotatably supported thereon, and the rollers 160 have contacts 162 and insulation 161 and 163 contiguous thereto, FIGURE 16.

As shown in FIGURE 24 for example there is further provided locking pins 164 which have their inner ends pointed as at 165 for selectively engaging openings or holes 166 and 167 in the pitch rings 79, and spring members 168 are operatively connected to the locking pins 164 for normally urging or biasing the locking pins 164 inward towards the pitch rings 79. The locking pins 164 include outer end portions 169 that are arranged in engagement with the second cam sections 156 of the cams 154.

As shown in FIGURE 24, there is also provided a locking rod 171 which is adapted to have its inner ends selectively engage notches 170 on the pitch rings 79, and a solenoid 172 is connected to the outer end of the rod 171, there being a coil spring 173 circumposed on an outer end portion of the rod 171. A contact 174 is carried by the rod 171, and the contact 174 is mounted for movement into and out of electrical engagement with a contact 175 so that as later described in this application an electrical circuit can be selectively opened or closed to the motor 82 in order to control shifting movement of the pitch ring whereby the pitch of the propellers 98 can be varied or regulated as desired.

The electrical circuit for the aircraft of the present invention further includes switches 176 and 183, FIGURE 24. As shown in the drawings the switch 176 consists of a circular disc 177 which has an arm or bar 178 pivotally connected thereto as at 179, and terminals 180 on the disc 177 are adapted to be selectively engaged by contacts 182 on the end portions 181 of the arm 178.

The second switch 183 is shown to comprise a casing 184, FIGURE 31, and the casing 184 is recessed as at 185 so as to provide a generally circular wall surface 186 that has a flanged section 187 thereon, FIGURE 30, and a plurality of spaced apart terminals 188 are connected to the flanged section 187. The numeral 189 indicates conductor rings in the casing 184, and wires or conductors 190 are electrically connected to the rings 189. As shown in FIGURE 31 for example a securing element or pin 191 extends through the central portion of the casing 184, and a movable arm 192 includes a hub or knob portion 193 that is mounted on the pin 191, and the knob portion 193 is adapted to be roughened or knurled as at 194 so as to facilitate the manual gripping and rotation thereof. The numeral 195 indicates a pawl or dog which is carried by the outer end of the arm 192, and the pawl 195 is urged outwardly by a spring member 196, the pawl 195 being adapted to selectively engage notches 197 that are arranged in the section or surface 186 of the casing 184. A contact 198 is carried by the arm 192 for selectively engaging a terminal 199, and a contact 200 on the arm 192 is adapted to selectively engage a terminal 201. The numeral 202 indicates a wire or conductor which is electrically connected to the contact 198, and the conductor 202 is adapted to extend through a portion of the arm 192. The arm 192 is movably mounted in a recessed portion 203 of the base 190. A contact portion 204 on the base 190 is adapted to electrically have an electrical conductor 205 connected thereto, and a terminal 206 has a conductor 207 connected thereto.

In FIGURE 3 the numeral 208 indicates a passageway which can be used for permitting passengers, cargo or the like to be conveniently elevated into the passenger or cargo compartment of the aircraft and a suitable elevating mechanism can be used in conjunction with the passageway 208 to facilitate the ascending or descending of the passengers, cargo or the like.

As shown in the drawings, the aircraft of the present invention further includes a plurality of leg assemblies which are each indicated generally by the numeral 209, and these leg assemblies each have the same construction. While the aircraft has been illustrated with three of these leg assemblies 209, it is to be understood that the number thereof can be varied as desired or required. Each of the leg assemblies 209 includes an outer member or bushing 210 that is secured to or formed integral with the main housing of the aircraft, FIGURE 34, and a sleeve 211 is slidable in the bushing 210. The bushing 210 is provided with a slot 222, and pins 212 are suitably affixed to the sleeve 211, and the pins 212 are adapted to project through the slot 222 in order to prevent rotation of the sleeve 211. The numeral 213 indicates an externally threaded screw member which is arranged in threaded engagement with the sleeve 211, and the screw member 213 includes a reduced diameter upper end portion 214 which has guide members 215 arranged in engagement therewith, FIGURES 34 and 35, and the guide members 215 are connected to a block 216. A means is provided for rotating the screw member 213 and this means comprises a gear 217 which is suitably affixed to the end portion 214, and the gear 217 has a worm 218 arranged in meshing engagement therewith, and a shaft 219 is provided for rotating the worm or gear 218. The shaft 219 may be turned or rotated by any suitable means and as for example an engine, motor or the like can be used for rotating the shaft 219, or else a hand crank can be used for rotating the shaft 219.

As shown in the drawings, a spring member 220 is connected to the lower end of each sleeve 211, and a foot 221 is suitably affixed to each spring member 220. The spring members 220 function as shock absorbers so as to help cushion the landing impact of the aircraft.

In order to facilitate observation from the aircraft, as for example during landing or take-off, there is provided a periscope which is indicated generally by the numeral 223, FIGURE 1 and FIGURES 37, 38 and 39. The periscope 223 embodies an outer member or element 224 which is rotatable in bearings 225, and a partition 226 in the outer member 224 defines a chamber 227 through which moves an endless chain 228. The chain 228 is trained over sprockets 229 that are suitably affixed to trunnions or stub shafts 230 and 231, and the periscope further includes manualy movable knobs 232 which can be used for simultaneously shifting the angular position of upper and lower prisms 233 and 234. Viewing members 235 and 236 are suitably affixed to the upper and lower ends of the periscope as shown in the drawings.

As shown in FIGURE 3 for example, there is provided a plurality of radially disposed braces 237 for helping to maintain the housings 111 and their associated parts in their proper aligned position.

The numeral 238 indicates gear trains which consist of intermeshing gears which provide a driving connection between the shaft of the motor 152 and the cam 154.

From the foregoing, it is apparent that there has been provided an aircraft of the flying saucer type which can be used for various purposes such as military purposes or else it can be used in connection with peaceful transportation or the like, and the aircraft of the present invention can be used for transporting passengers, cargo or the like.

With the parts arranged as shown in the drawings, it will be seen that the aircraft 50 of the present invention includes the housing 51 which may have a cylindrical formation, and the upper and lower sections 52 and 53 may be arranged as shown in FIGURE 1, and the interior of the housing may be divided into compartments such as the compartments 57 and 58 by means of the horizontally disposed deck or floors 55 and 56, and these compartments can have engines, passengers or the like conveniently arranged therein. The compartment 57 may have the motors or engines 59 and 65 therein, and these engines may be actuated by any suitable means as for example by a suitable fuel such as gasoline, and the engine 59 serves to drive the generator 64 through the intermeshing gears 61 and 62 and the generator 64 can be used for supplying electrical energy for operating the various control mechanisms, lights or other accessories on the aircraft.

The engine 65 serves to rotate the shafts 66 which have the gears 67 thereon, and the gears 67 mesh with the gears 68 on the shafts 69, the shafts 69 having the gears 72 thereon which mesh with the teeth 71 of the ring gears 70 so that actuating the pair of engines 65 the upper and lower ring gears 70 can be caused to rotate around the housing 51. In view of the fact that the ring gears 70 are secured to or formed integral with the annular members or rings 75, as for example as shown in FIGURES 4 and 5, it will be seen that this rotation of the ring gears 70 will rotate the rings 75, and the rings 75 carry the bearings or rollers 76 which travel in the rails 74 so that the rings 75 will be properly aligned as they rotate around the rings 73. The rings 73 are fixedly secured to the wall portion 49 of the housing 51, but as previously stated the rings 75 are free to rotate around the rings 73. The rings 75 have secured thereto the rings 78, FIGURES 4 and 5, and as the rings 75 turn they carry the rings 78 therewith. The rings 78 are operatively connected to the propellers 98 through the medium of the shafting 48 so that this rotation of the rings 78 will cause the upper and lower sets or groups of propellers 98 to rotate and in view of the fact that the upper set of the propellers 98 rotate in an opposite direction from the lower set of propellers 98, a counter balancing effect will be created or provided on the housing 51 whereby the housing 51 will not rotate. This rotation of the propellers 98 will provide lift or thrust so that the aircraft can be ready to travel in a general vertical upward or downward direction, or else as later described in this application the aircraft can be made to fly forward or backward or in a desired angular direction. The propellers 98 include an intermediate thickened portion as shown in FIGURE 7e, and the outer edges of the propeller tapered to a sharp edge as indicated by the numeral 101 so that a propeller of a highly efficient construction is provided which will travel through the air in such a manner as to provide the maximum amount of thrust or lift in the most efficient manner.

The outer portion of the propellers 98 are slidably connected to the shafts 104 by means of the openings or recesses 103, and according to the present invention a means is provided for varying the pitch of the propellers 98 so that by varying the pitch of the propellers the speed of flight of the aircraft can be readily controlled or regulated as desired.

In addition, a means is provided for tilting the propellers 98, as for example the angle of the propellers can be tilted from a position such as that shown in FIGURE 7 to a position shown in FIGURE 21 or the propellers can be tilted back and forth from positions similar to those shown in FIGURES 21 and 22 and this tilting of the propellers provides a means for steering the aircraft or causing the aircraft to travel in a desired direction or up and down as desired.

To tilt the propellers 98, there is provided on the intermediate non-rotating support unit 109, the slide bars or arms 118 which are operatively connected to the rings 106, so that by moving the slide bars or arms 118 as for example by actuating the motors 119, the rings 106 can be raised or lowered in order to correspondingly raise or lower the rings 105 which will have the effect of tilting the propellers 98 to the desired location.

The aircraft of the present invention further includes the extensible or retractable legs 209, and for example when the aircraft is in flight the legs 209 can be moved to a retracted position, and when the aircraft is landing the leg assemblies 209 can be extended. To extend the legs 209, it is only necessary to rotate the shaft 219 as for example by means of a hand crank, motor or the like, and this will rotate the gear 218 that meshes with the gear 217 so as to turn the screw member 213. Longitudinal shifting of the screw member 213 is prevented by the guides 215 which are connected to the block 216. As the screw member 213 is rotated, it will cause the sleeve 211 to be moved up or down in view of the fact that the sleeve 211 is arranged in threaded engagement with the threaded portion of the screw member 213, and the pins 212 extend from the sleeve 211 through the slot 222 in the bushing 210 so as to prevent rotation of the sleeve 211. This longitudinal shifting of the sleeve 211 will cause the spring member 220 to move in a corresponding direction, and since the spring 220 is connected to the foot 221, it will be seen that the foot 221 will move with the sleeve 211. The spring 220 functions as a shock absorber to help cushion the landing impact of the aircraft.

There is also provided a periscope 223 which is adapted to be of a suitable construction so as to permit a pilot or other person in the aircraft to more readily view the area in the vicinity of the aircraft as for example when the aircraft is landing or taking off, and for example a pilot may look through the viewing member 235 and due to the provision of the opposed prisms 233 and 234, the area in the line of vision of the viewing member 236 can be viewed by a person looking through the viewing member 235. The prisms 233 and 234 are operatively connected together for simultaneous adjustment as for example by means of the chain 228 which is trained over sprockets 229 so that by manually turning the knobs 232 the angular position of both prisms 233 and 234 can be simultaneously adjusted in order to permit the user to set the periscope in such a manner that a particular area can be readily observed. The periscope is adapted to be conveniently supported in a bearing assembly 225 whereby the periscope can be readily rotated in order to widen the range of vision that is adapted to be covered by the periscope.

The parts can be made of any suitable material and in different shapes or sizes.

It is to be noted that the aircraft of the present invention is provided with upper and lower sets of propellers 98, and there is provided for each of the sets of propellers upper and lower pitch adjusting means as well as upper and lower means for tilting the angle of the propellers and since the construction of the upper and lower assemblies are generally the same it is thought that a description of one will suffice for both. However, the upper propellers do rotate in an opposite direction from the lower propellers so as to insure that the housing 51 will remain free of rotation because the oppositely rotating propellers will counter balance any tendency to cause rotation of the housing 51.

The means for raising and lowering or tilting the propellers is generally as follows. As shown in FIGURE 7b there are two of the motors 119 for each housing 111, and these motors 119 can be energized individually or collectively to either raise the top or bottom ring 106 in order to tilt the upper or lower propeller mechanism, as for example as shown in FIGURE 21 or FIGURE 22. In actuating the propeller tilting mechanism as for example to steer the aircraft, the switch 176 is first actuated by moving the arm 178 to the position shown in FIGURE 24 and this will complete an electrical circuit to a motor 152 which will retract the locking pin 164 from the opening 156 in which it is arranged, and the electrical circuit can be completed to the switch 183 and this will energize the solenoid 172 so that the rod 171 will be retracted from the notches 170, and the contacts 175 and 174 will be closed in order to complete the circuit to the motor 82. With the motor 82 energized, the gear 81 will be turned, and since the gear 81 meshes with the teeth 80, it will be seen that this actuation or energization of the motor 82 will rotate the pitch ring 79. By rotating the pitch ring 79 or shifting the pitch ring 79, the teeth 86 of the pitch ring will cause rotation of the gear 88 of the gear reduction unit 87 and this in turn will rotate the shaft 90 which in turn will cause rotation of the gear 89 that meshes with the gear 91, and rotation of the gear 91 rotates the shaft 92 which has the gear 93 thereon. The gear 94 meshes with the gear 93, FIGURE 11, and the gear 94 is on the shaft 95, so that the shaft 95 will be shifted or turned, and since the shaft 95 is connected to the shaft 48 through the universal mounting 97, it will be seen that this shifting of the pitch ring 79 will cause the propellers 98 to be shifted or have their pitch changed and the pitch of the propellers can be set or regulated as desired or required in order to effectively and efficiently control the speed of the aircraft. That is, by having the propellers set at a particular pitch, the aircraft can be made to fly or travel at a particular speed for a given power output of the engines, and by varying or changing the pitch of the propellers, the speed for a particular engine output can be changed as desired.

The mechanism shown in FIGURES 7a through 7c for example is adapted to be used for tilting the propellers to different angles, and for example by properly energizing the motors 119, the shafts 122 can be rotated through the provision of the intermeshing gears 120 and 121, and this rotation of the shafts 122 will cause rotation of the gears 126 as previously described, and since the gears 126 mesh with the teeth 127 of the racks 115, it will be seen that the racks 115 will be shifted between the walls 112 of the housing 111. In view of the fact that the arms or slide bars 118 are connected as at 117 to the moving racks 115, it will be seen that this movement of the racks 115 by energization of the motors 119 will cause the arms 118 to move the rings 106 towards or away from the housing 111 due to the provision of the connector mechanism 129 and its associated parts. That is, by causing the arms 118 to move, the rings 106 can be moved towards or away from the support 109 and since the rings 106 are affixed to the rings 105, and in view of the fact that the rings 105 are connected by means of the universal joints 108 to the shafts 104, it will be seen that the outer portions of the propellers can be raised or lowered in order to position the propellers at a desired angular position whereby this construction provides a means of causing the aircraft to travel in a level flight, move up or down or in any desired direction. The shafts 104 are slidably fitted in the openings 103 in the outer portions of the propellers so that a sliding connection is provided for the propellers in order to compensate for different positions of the propellers so that there will be no binding of the parts.

The braces 140 embody a telescoping connection so that the braces 140 can help maintain the parts in their proper aligned positions regardless of the shifted or tilted position of the propellers.

The aircraft of the present invention embodies an electrical system for operating or changing the pitch of the propellers and also for raising and lowering the units to change the angle of the propeller rings. There is also provided a locking and unlocking mechanism in conjunction with the pitch changing arrangement. Suitable calibrated scales or instrument gauges or indicating mechanisms can be used in conjunction with the switches and control mechanisms so that the parts can be set accurately at the desired location or position.

The engines can be operated from any suitable source of power such as gasoline, diesel fuel or the like.

It will therefore be seen that according to the present invention there has been provided a wingless aircraft that has propellers positioned around the passenger compartment instead of over, under, in front or behind the compartment, and the aircraft of the present invention will fly straight up, forward, back or to one side. There is provided a mechanism consisting of a ring around the outer tip of the propellers so as to distribute the lift to the outer and inner tips in an even and uniform manner. By having the upper and lower sets of propellers turning in opposite directions with respect to each other, there will be provided a means for stabilizing the passenger compartment so that the passenger compartment or housing will not rotate. It is to be understood that various accessories are adapted to be used in conjunction with the aircraft such as seats, an instrument panel, windows, a parachute compartment, fuel tanks, luggage compartments, and the like. The aircraft of the present invention utilizes oppositely spinning rotors or propellers to insure that the aircraft can travel in the most efficient manner, and there is also provided a means for tilting and changing the pitch of the propellers so that the speed and flight direction can be readily controlled.

Referring to FIGURE 24 of the drawings, it is to be noted that when the switch 176 is in the position shown, current goes to the motor 152, and the cam 156 first pulls the pin 164 from the openings 166 and then the cam 165 shifts the rod 157 so as to move the rollers 160 into or out of engagement with the proper rings 148 so as to stop the motor 152. The switch 176 is then actuated by moving its arm 178 from the solid line position of FIGURE 24 to the dotted line position of FIGURE 24 so that an electrical current goes to the switch 183. By turning the knob 193, the contacts close and the electrical current goes to the motor 82 when the contacts 174 and 175 are closed. The propeller shifting ring is provided with the nine notches 170 to correspond with the nine holes 166 and 167. As the switch 183 is moved, current is first supplied to the solenoids 172 which retracts the pin 171 from the notch 170 and then the motor switch 183 is actuated, and the motor runs until the pin 171 drops in the next notch 170 and then the contacts 175 and 174 open so as to stop the motor 82 whereby the propellers will have moved approximately ten degrees. When the switch 183 is operated in the opposite direction, the motor 82 is reversed.

The switch 183 is adapted to be operated by moving its arm 192 until the dog 195 enters a notch 197, and the motor runs until the pin 171 enters a notch 170 in the pitch ring 179.

It is to be noted that according to the present invention the motor 59 operates the shaft 60 and gears 61, and the gear 61 meshes with the gear 62 on the shaft 63. The shaft 63 is connected to the electrical generator 64, and the motor 59 supplies power for the electrical generator 64. The electrical generator 64 is adapted to supply electricity to all motors with the exception of the motors 59 and 65, and also supplies electricity for all electrical accessories or the like. The motor 59 is adapted to be a lightweight air cooled engine which utilizes gasoline as its fuel, although other types of fuel such as kerosene, diesel or the like can be used. The electrical generator 64 is also adapted to be made light in weight and air cooled.

The engines or motors 65 operate shafts 66 and gears 67, and the gears 67 meshes with the gear 68 on the shaft 69. The shaft 69 operates the gears 72, and the gears 72 mesh with the teeth 71 of the upper and lower ring gears 70. The upper and lower ring gears 70 which are secured to or formed into the upper and lower ring members, are arranged as shown in the drawings. The engines or motors 65 supply the power for rotating the propeller, and the engines or motors 65 are preferably lightweight air cooled aircraft engines which will pass requirements such as FAA requirements, and the operating fuel may be gasoline, kerosene, diesel fuel or the like.

The support rings 73 are secured to or formed into the housing 51. The tracks or rails 74 are secured to or formed into the support rings 73. The upper and lower ring members 75 which have upper and lower ring gears 70 secured to or formed integral therewith, are provided as shown, and tapered bearings 76 are secured to the ring members 75 by means of securing elements 77, the tapered bearings 76 being mounted for movement through tracks in the support rings 73, and these tapered bearings 76 are adapted to be adjusted by the securing elements 77 which will locate the upper and lower ring members 75 away from the tracks 74 and support rings 73. The ring members 75 will be held away evenly from the tracks 74 and the support rings 73.

The ring elements 78 are secured to or formed into the ring members 75. The pitch rings 79 have teeth 80 along a portion thereof, and gear 81 meshes with the teeth of the pitch rings 79. The gear 81 is driven by an electric motor 82. The lugs 83 are secured to or formed into the ring elements 78, and pins 84 extend through the lugs 83, and the pins 84 also extend through the slots 85 in the pitch ring 79. The lugs 83 and pins 84 hold the pitch rings 79 and permit it to turn in either direction. The electric motor 82 supplies power to turn pitch rings 79 in either direction. The electric motor 82 is adapted to be a light weight air cooled reduction motor.

The gear reduction unit 87 includes a gear section 88 that meshes with the teeth 86 and adjacent pitch ring 79. The gear reduction 87 includes a gear section 89 contiguous to gear section 88, and these gear sections 88 and 89 are arranged on supporting shaft 90. The gear 91 meshes with the gear 89, and the gear 91 is on the shaft 92 along with the gear 93. The gear 93 meshes with the gear 94 on the shaft 95. The shield or cover member 96 is to cover the gear reduction unit 87. The shaft 95 is connected to a driven shaft 48 through the medium of a universal joint 97. Propellers or blades 98 have openings 99 in an end for receiving a corresponding shaft 48, and propellers 98 are secured to the shaft 48 by means of securing elements 100. The propellers 98 are tapered on the edges 101, and have elongated enlarged shoulders or ridges 102. These propellers 98 have recesses or openings 103 for receiving a slidable connection or shaft 104. The shafts 104 are connected to the ring pieces 105, and ring units 106 surround the ring pieces 105. The tracks or rails 107 are secured to or formed into the ring units 106. The tapered bearings 76 are secured to the ring pieces 105 by means of securing elements 77, and the universal joints 108 are for connecting the shafts 104 to ring pieces 105. The gear reduction unit 87 is for when gear 81 rotates one full turn, the propellers 98 will turn ten degrees. The electric motor 82 turns the pitch rings 79, and in turn turns gear reduction unit 87, which also in turn turns propellers 98 through universal joints 97. The tapered bearings 76, due to the provision of the securing elements 77, and both ring members 75 and ring pieces 105, permit the propellers 98 to rotate about the housing 51. The universal joints 97 and 108 are to permit the propellers 98 to change the angle as hereinafter explained.

The circular support units 109 consist of curved sections 110 which have adjacent ends jointed together by body elements 111. The body elements include spaced apart wall members 112, and the wall members 112 have slots or grooves 113 and 114. The sliding racks 115 have tongues 116 for sliding movement in the grooves 114. Pins 117 extend through bars or arms 118 and are mounted for sliding movement through the slots 113. Motors 119 have the gears 120 connected thereto, and the gears 120 mesh with the gears 121 on the shaft 122, the shafts 122 having gears 123 that mesh with gears 124 on shafts 125. The shafts 125 have gears 126 that mesh with the teeth 127 of the racks 115, and the electric motors 119 are preferably light in weight and air cooled gear reduction motors.

The arms 118 are connected to plate portions 128 of the racks 115 by means of the pivot pins 117.

As shown in the drawings, the connector assemblies 129 include bracket members 130 that have interfitting parts 131, and the interfitting parts 131 are connected to the arms 118 by pins 118a. The pin or stud 132 extends through the interfitting parts 131, and the bracket 133 is secured to or formed into with the stud 132. The rollers 134 are movably mounted in the bracket 133, and a rod 135 is connected to the rollers 134 with collars 136 and 137 spaced apart on rod 135. The rod 135 extends through a bracket piece 139 that is secured to a corresponding ring 106, and a coil spring 138 is arranged on each rod 135.

The electric motors 119 drive racks 115 which have arms 118 connected so that they may pivot. The arms 118 are connected to the interfitting parts 131 so that they too may pivot. The interfitting parts 131 are made so that they can bend in the middle over the stud 132. The interfitting parts 131 are connected to the bracket 133 by the stud 132. The bracket 133 has a slanted track therein, by which the rollers 134 roll. The rollers 134 are connected to the rod 135, and the rod 135 has collars 136 and 137 spaced on it, and spring 138 is connected to the rod 135, and the bracket piece 139. When the ring unit 106 changes angle, as at one point being raised and at the other two points being lowered, the bracket 133 will turn to compensate for the change of position of ring unit 106. The spring 138 is for the purpose to return bracket 133 to the original position, when the ring units 106 are level again. The interfitting parts 131 are for compensating arms 118 when they raise and lower.

It is to be noted that the brace assemblies 140 include outer hollow members 143 that are pivotally connected as at 142 to ears 141, and the ears 141 are secured to or formed into the ring pieces 105. The inner members 144 are mounted for telescoping or sliding movement in the outer members 143, and the inner members 144 are pivotally connected between the ears 145 as at 146, and the ears 145 are secured to or formed into ring elements 78. Brace assemblies 149 are to help the propellers 98 so that they will not create a back lash at the ring pieces 105.

The circular plates 147 are secured to or formed into wall portion 49 of the housing 51. The tracks 148 are affixed to the plates 147. The tracks 148 are insulated from the plates 147 by means of insulation 149. The electrical conductors or wires 150 are electrically connected to the tracks 148. The supporting bracket 151 is contiguous to a driving motor 152 which serves to rotate or selectively drive a cam 154 that is mounted on the shaft 153. The cam 154 includes a pair of sections 155 and 156, and the sections 155 and 156 are arranged in superimposed relation with respect to each other. The rod 157 which has a portion 158 arranged to engage with the first cam section 155, and the rod 157 includes a supporting section 159 which has rollers 160 rotatably supported, the rollers 160 having contacts 162 and insulation 161 and 163 arranged adjacent thereto.

As shown in the drawings, locking pins 164 have their inner ends pointed as at 165 for selectively engaging openings or holes 166 and 167 in the pitch rings 79, and spring members 168 are operatively connected to the locking pins for normally urging or biasing the locking pins 163 inward towards the pitch rings 79. The locking pins 164 include outer end portions 169 that are arranged in engagement with the second cam section 156 of the cams 154.

The locking rod 171 which is adapted to have its inner ends selectively engage the notches 170 in the pitch rings 79, is arranged as shown, and a solenoid 172 is connected to the outer end of the rod 171. The coil spring 173 is circumposed on an outer end portion of the rod 171, and the contact 174 is carried by the rod 171, and the contact 174 is mounted for movement into and out of electrical engagement with a contact 175.

The switch 176 consists of a circular disc 177 which has an arm or bar 178 pivotally connected at 179, and terminals 180 on the disc 177 are adapted to engage the contacts 182 on the end portions 181 of the arm 178.

The switch 183 is recessed as at 185 to provide a circular wall surface 186 that has a flanged section 187. Terminals 188 are connected to the flanged section 187. Conductor rings 189 in the casing 184, and wires or conductors 190 are electrically connected to the rings 189. The securing element or pin 191 extends through the center portion of the casing 184, and a movable arm 192 includes a hub or knob portion 193 that is mounted on the pin 191, and the knob portion 192 is roughened or knurled as at 194 so as to be readily gripped manually. The pawl or dog 195 which is carried by the outer end of the arm 192, is urged outwardly by the spring member 196, the pawl 195 is adapted to engage notches 107 that are arranged in the section or surface 186 of the casing 184. The contact 198 is carried by the arm 192 for engaging a terminal 199, and a contact 200 of the arm 192 engages a terminal 201. The wire or conductor 202 which is electrically connected to the contact 198, and the conductor 202 extends through a portion of the arm 192. The arm 192 is movably mounted in the recessed portion 203 of the base 190. The contact portion or pulsating unit 204 on the base 190 with the electrical conductor 205 connected, and a terminal 206 for a pulsating unit 204 has a conductor 187 connected thereto.

It will be noted that electricity will flow to the switch 176 to the three terminals one at terminal 181 and two at terminal 180. As shown in locked position, as the electricity flows to the terminal 181 through the contact 182 to the electrical tracks 148 and to the motors 152 which turn cams 154 that let the rod 164 lock in the pitch rings 79 and the rod 157 can move the rollers 160 to the opposite tracks breaking contact. Also in the position shown electricity will not flow to the switch 183. Turning the arm 178 into the other position electricity flows to the terminal 180 through the contact 182 to the electrical tracks 148 and to the motor 152 which turn the cams 154 to let the rod 164 unlock from pitch rings 79 and rod 157 will move the rollers 160 to the original tracks. Also, the electricity will flow to the terminal 180 opposite the side through the contacts 182 to the switch 183, at the conductor ring 189 through the conductors 190 through the conductor 202 to contacts 198 and 200. The contacts 198 and 200 engage with the terminals 199 and 201. The terminal 199 is for reversing and terminal 201 is for forwarding motor 82. The pawl 195 is to hold the arm 192 in place in the notches 197. The electricity from the terminals 199 and 201 also flows through a solenoid 172 and back through the electrical conductor 205 to the contact portion or pulsating unit 204, the solenoid 172 pulls the rod 171 out of notches 170 and the contacts 174 and 175 connect allowing the motor 82 to operate. The contact portion or pulsating unit 204 will pulsate so as to let the rod 171 into the next notch 170. The terminal 206 contacts the terminal 188 and each time the terminal 206 contacts a terminal 188 the contact portion or pulsating unit 204 will pulsate the same number of times. Conductor 207 is for electricity to operate the pulsating unit 204.

The passageway 208 serves to permit passengers, cargo or the like to move therethrough.

The leg assemblies 209 include the outer members or bushings 210 that are secured to or formed into the main housing, and the sleeve 211 is slidable in the bushing 210. The bushing 210 has a slot 222, and pins 212 are affixed to the sleeve 211, and the pins 212 project through the slot 222 to prevent rotation of the sleeve 211. Externally threaded screw members 213 are arranged in threaded engagement with the sleeve 211, and the screw member 213 includes a reduced diameter upper end portion 214 which has guide members 215 arranged in engagement therewith. The guide members 215 are connected to a block 216. Rotating screw member 213 is accomplished by the gear 217 affixed to the end portion 214, and the gear 217 meshes with the worm 218. The shaft 219 is powered by a motor or crank or the like.

The spring member 220 is connected to the lower end of each sleeve 211, and a foot 221 is affixed to each spring member 220 in order to cushion the landing of the aircraft.

As shown in the drawings, the periscope 223 includes an outer member or elements 224 which is rotatable in bearings 225, and a partition 226 in the outer member 224 defines a chamber 227 through which moves an endless chain 228. The chain 228 is trained over sprockets 229 affixed to trunnions or stub shafts 230 and 231. Knobs 232 are used for shifting the angular position of the upper and lower prisms 233 and 234. The viewing members 235 and 236 are affixed to the upper and lower end of the periscope 223, and the periscope is for viewing the underside of the aircraft while landing or the like.

Radially disposed braces 237 function as an added support from the main housing to the circular support unit for changing the angle of the propellers.

The gear train 238 between the motor 152 and the cam 154 serves as a reduction unit for the cam 154.

It is to be noted that the aircraft of the present invention embodies a tubular design which provides a lightweight construction without loss of strength, and wherein the material for making certain of the parts may be aluminum, steel or the like and any suitable material can be used that will pass FAA requirements.

Minor changes in shape, size and rearrangement of details coming within the field of invention claimed may be resorted to in actual practice, if desired.

What is claimed is:

1. In an aircraft, a housing, upper and lower sets of propellers mounted for rotation about said housing, means for varying the pitch of the propellers, and means for tilting the angular position of the propellers, said housing having a plurality of compartments therein, said upper and lower sets of propellers rotating in opposite directions relative to each other, a means for tilting the propellers comprising a circular support surrounding said housing and interposed between the upper and lower sets of propellers, and power operated means on said support operatively connected to said propellers, extensible legs depending from said aircraft, said legs having spring supported feet associated therewith, a periscope depending from the aircraft, said propellers including tapered edge portions, and manually operable switch means for regulating and controlling the varying of the pitch of the propellers.

2. An aircraft comprising a housing, engines in said housing, shafts driven by said engines, gear means on said shafts, upper and lower ring gears surrounding said housing and said ring gears having teeth thereon meshing with said gear means, spaced parallel upper and lower tubular support rings surrounding said housing and secured thereto, rails in said support rings, rotary ring members surrounding said support rings, bearings connected to said ring members and said bearings being movable in said rails, said ring gears being affixed to said ring members, ring elements surrounding said housing and said ring elements being affixed to said ring members, pitch rings surrounding said housing and said pitch rings having teeth on a portion thereof, a motor driven gear member meshing with the teeth of a pitch ring; a plurality of spaced apart lugs on each ring element, pins connected to said lugs, there being spaced apart slots in said pitch rings for the projection therethrough of said pins, said pitch rings each having a toothed portion, a gear reduction unit connected to a ring element and said gear reduction unit including a gear element meshing with the toothed portion of the pitch ring, a drive shaft connected to said gear reduction unit, a driven shaft connected to said drive shaft through the medium of a universal joint, a propeller connected to said driven shaft, there being recesses in the outer ends of the propellers, stub shafts slidably engaging said recesses, a hollow tubular ring piece connected to said stub shafts by means of universal joints, bearings connected to said ring piece, tubular ring units surrounding said ring pieces, rails in said ring units for receiving said last named bearings; a circular support unit surrounding said housing and said support unit comprising a plurality of hollow arcuate sections having their adjacent ends connected together by body elements, said body elements each comprising wall members provided with slots and grooves therein, toothed racks having tongues slidable in the grooves in said wall members, gears meshing with said toothed racks, motors for operating said last named gears, plates affixed to said racks, arms having end portions pivotally connected to said plates, connector assemblies operatively connecting said arms to said ring units, and support means for said pitch rings, support unit, and motors.

References Cited in the file of this patent

UNITED STATES PATENTS

| | | |
|---|---|---|
| 968,860 | Kummer | Aug. 30, 1910 |
| 1,868,392 | Leffert | July 19, 1932 |
| 2,444,332 | Briggs | June 29, 1948 |
| 2,740,595 | Bakewell | Apr. 3, 1956 |